(12) United States Patent
Takagi et al.

(10) Patent No.: US 10,259,296 B2
(45) Date of Patent: Apr. 16, 2019

(54) DOOR CHANNEL

(71) Applicant: SHIROKI CORPORATION, Fujisawa-shi (JP)

(72) Inventors: Kazuyuki Takagi, Fujisawa (JP); Atsuo Noda, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/804,367

(22) Filed: Nov. 6, 2017

(65) Prior Publication Data
US 2018/0134128 A1    May 17, 2018

(30) Foreign Application Priority Data
Nov. 11, 2016  (JP) .................................. 2016-220602

(51) Int. Cl.
*E06B 7/16*    (2006.01)
*B60J 5/04*    (2006.01)
*E05D 15/16*   (2006.01)

(52) U.S. Cl.
CPC ........... *B60J 5/0402* (2013.01); *E05D 15/165* (2013.01); *E05Y 2900/55* (2013.01)

(58) Field of Classification Search
CPC ... B60J 5/0402; E05Y 2900/55; E05D 15/165
USPC ...................................................... 49/479.1
See application file for complete search history.

(56) References Cited

U.S. PATENT DOCUMENTS

| 1,914,216 | A  | * | 6/1933  | Schlegel ................. | B60J 10/74 49/376 |
| 2,217,875 | A  | * | 10/1940 | Nauert .................. | F25D 23/082 49/479.1 |
| 2,228,368 | A  | * | 1/1941  | Schlegel ................. | B60J 10/80 428/123 |
| 6,240,677 | B1 | * | 6/2001  | Baumann ................. | B60J 10/79 49/479.1 |
| 8,051,606 | B2 | * | 11/2011 | Maaβ ...................... | B60J 10/74 49/479.1 |
| 8,458,959 | B2 | * | 6/2013  | Ohtake .................. | B60J 5/0402 49/479.1 |
| 8,646,213 | B2 | * | 2/2014  | Suzuki ................... | B60J 10/78 49/479.1 |

(Continued)

FOREIGN PATENT DOCUMENTS
JP         2002-321530 A    11/2002

*Primary Examiner* — Jerry E Redman
(74) *Attorney, Agent, or Firm* — McGinn IP Law Group, PLLC.

(57) ABSTRACT

A door channel, which is provided in a space formed between an inner panel and an outer panel of a vehicle door, the door channel includes: a frame monolithically that has: a vertical frame portion, which extends in a vertical direction of a vehicle; a horizontal frame portion, which extends in a front-and-rear direction of the vehicle; and a curved bent portion, which connects the horizontal frame portion and the vertical frame portion, wherein a curved part and a linear part in the bent portion are present in an outer edge of the outer circumferential wall part, a notch which is open to an inner corner part of the bent portion is provided in the side wall part, and both ends of the notch extend to a position that exceeds a boundary between the curved part and the linear part in the bent portion.

6 Claims, 5 Drawing Sheets

(56) References Cited

U.S. PATENT DOCUMENTS

| | | | | |
|---|---|---|---|---|
| 8,726,576 B2* | 5/2014 | Kobayashi | ............ | B60J 10/042 49/441 |
| 9,027,285 B2* | 5/2015 | Fukui | .................... | B60J 5/0402 49/440 |
| 9,849,757 B2* | 12/2017 | Stachewicz | ............ | B60J 5/0402 |
| 2002/0139054 A1* | 10/2002 | Schlachter | ............... | B60J 10/88 49/479.1 |
| 2011/0265387 A1* | 11/2011 | Giroux | .................... | B60J 1/007 49/479.1 |

* cited by examiner

DOOR CHANNEL

CROSS-REFERENCE TO RELATED APPLICATION

This application claims priority from Japanese Patent Application No. 2016-220602 filed on Nov. 11, 2016 the entire subject matter of which is incorporated herein by reference.

TECHNICAL FIELD

This disclosure relates to a door channel which is provided in a space formed between an inner panel and an outer panel of a vehicle door.

BACKGROUND

A door channel is disclosed in JP-A-2002-321530. The door channel is provided in a space formed between an inner panel and an outer panel of a vehicle door. The door channel guides a door glass to be freely lifted and lowered. The door channel includes a vertical frame portion which extends in a vertical direction of a vehicle and a horizontal frame portion which extends in a front-and-rear direction of the vehicle.

SUMMARY

There is an attempt to form the door channel by performing bending on a single metal member. However, wrinkle occurs due to plastic deformation in a bent portion formed between the vertical frame portion and the horizontal frame portion. When the wrinkle occurs, the airtightness or the like of the door is deteriorated.

In this regard, this disclosure provides a door channel in which wrinkle is suppressed during bending.

A door channel, which is provided in a space formed between an inner panel and an outer panel of a vehicle door and guides a door glass therein to be freely lifted and lowered, the door channel includes: a frame, which monolithically has a side wall part that faces at least one of the inner panel or the outer panel and an outer circumferential wall part that extends in a direction to intersect with at least one of the inner panel or the outer panel. The frame monolithically has: a vertical frame portion, which extends in a vertical direction of a vehicle; a horizontal frame portion, which extends in a front-and-rear direction of the vehicle; and a curved bent portion, which connects the horizontal frame portion and the vertical frame portion and is formed by bending. A curved part and a linear part in the bent portion are present in an outer edge of the outer circumferential wall part. A notch which is open to an inner corner part of the bent portion is provided in the side wall part. Both ends of the notch extend to a position that exceeds a boundary between the curved part and the linear part in the bent portion.

In the door channel according to this disclosure, the both ends of the notch extend to a position that exceeds the boundary (referred to as an R end) between the curved part and the linear part, and thus wrinkle hardly occurs in the bent portion during the bending.

During the bending, a plastically deformed excess thickness portion moves toward the inner corner part of the bent portion. The excess thickness portion can be released by the notch which is open to the inner corner part of the bent portion, and thus the wrinkle hardly occurs.

In addition, the excess thickness portion is gathered in the end part of the notch in the vicinity of the R end, and the excess thickness portion easily protrudes vertically from the side wall part. However, the end part of the notch extends to a position that exceeds the R end, and thus the excess thickness portion hardly protrudes out.

In the above described door channel, the notch is formed such that a width of a remaining side wall part, which is a part of side wall part and is not removed by the notch, is a uniform width.

In the door channel according to this disclosure, during the bending, stress is equally applied to the outer portion of the bent portion which is a portion of the remaining side wall, which is a part of side wall part and is not removed by the notch. For this reason, wrinkle or distortion hardly occurs in the outer portion of the bent portion.

In the above described door channel, the notch has: a vertical portion, which extends along the vertical frame portion; a horizontal portion, which extends along the horizontal frame portion; and a inclined portion, which extends toward the inner corner part of the bent portion.

In the door channel according to this disclosure, the excess thickness portion which moves from the outer portion of the bent portion is absorbed by the vertical portion and the horizontal portion. Thus, wrinkle or distortion hardly occurs in the outer portion of the bent portion.

In addition, the excess thickness portion which moves toward the inner corner part of the bent portion is absorbed by the inclined portion. Thus, wrinkle or distortion hardly occurs in the inner portion of the bent portion.

In the above described door channel, the frame has a step part in which a glass run elastically supporting the door glass is fitted, the step part is formed in the side wall part to have a uniform sectional shape from the vertical frame portion through the bent portion to the horizontal frame portion, and the notch is provided inside from the step part.

In the door channel according to this disclosure, the notch is provided in a position that avoids the step part. Thus, it is not necessary to change the shape of the glass run to be fitted to the step part from the existing glass run, so that the existing glass run can be diverted.

In the above described door channel, the side wall part has: an inner wall facing the inner panel; and an outer wall facing the outer panel, and wherein the notch is provided in the inner wall.

In the door channel according to this disclosure, the notch may not be provided in the outer wall, and thus the sealing performance between the door channel and the outer panel can be maintained high.

In the above described door channel, a width of the outer wall is equal to or less than a width of the remaining inner wall, which is not removed by the notch.

In the door channel according to this disclosure, when a base material is bent, the same level of stress can be applied to the outer wall and the inner wall, and the door channel can be obtained which is excellent in dimensional accuracy.

According to this disclosure, the door channel in which wrinkle is suppressed during the bending can be provided.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
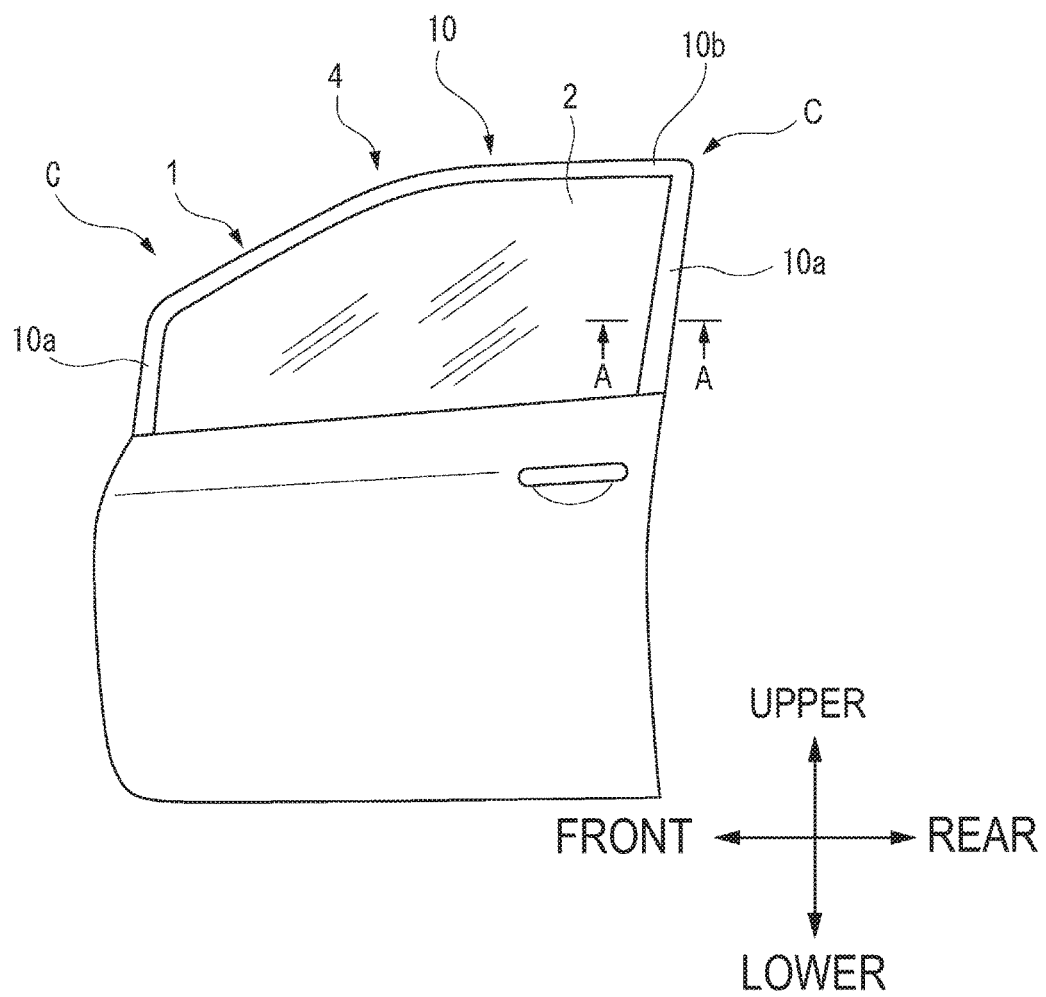
FIG. 1 is a front view of an example of a vehicle door.

Hereinafter, one embodiment (hereinafter, simply referred to as the embodiment) of this disclosure will be described with reference to the drawings. For the members having the same reference numerals as those already described in the description of the embodiment, the description thereof will be omitted for convenience of description. In addition, dimensions of members illustrated in the drawings may be different from actual dimensions of the members for convenience of description.

FIG. 1 is a front view of an example of a vehicle door 1 (hereinafter, simply referred to as a door 1.). As illustrated in FIG. 1, the door 1 includes a door glass 2 and a door panel 4 which is configured to guide a vertical movement of the door glass 2.

Figure 2:
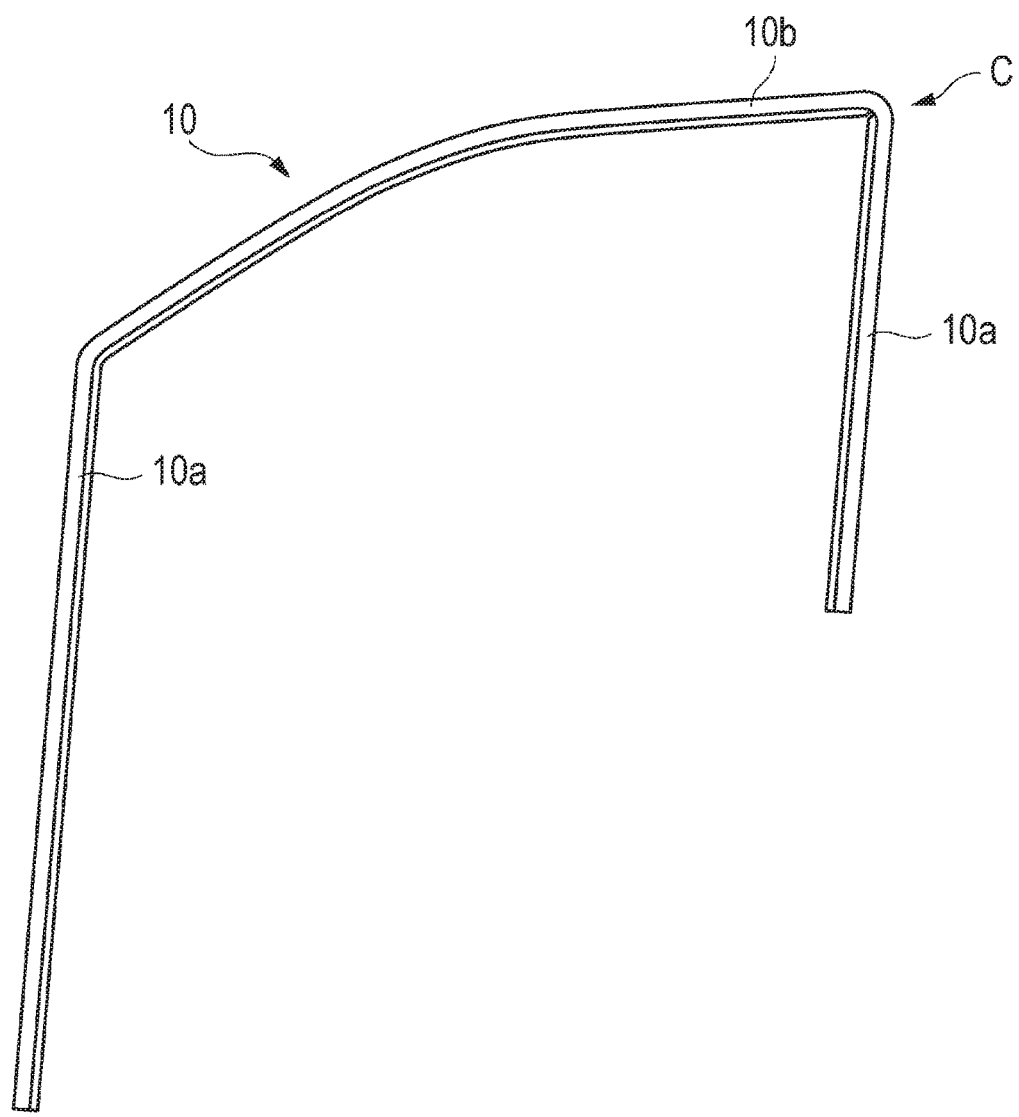
FIG. 2 is an overall view illustrating a door channel according to an embodiment.

FIG. 2 is an overall view illustrating a door channel 3. As illustrated in FIG. 2, the door channel 3 has a metal frame 10. The frame 10 monolithically includes a vertical frame portion 10a which extends in a vertical direction of the vehicle, a horizontal frame portion 10b which extends in a front-and-rear direction of the vehicle, and a corner portion C (bent portion) which connects the vertical frame portion 10a and the horizontal frame portion 10b. The corner portions C are provided in two places of a front end and a rear end of the horizontal frame portion 10b.

Figure 3:
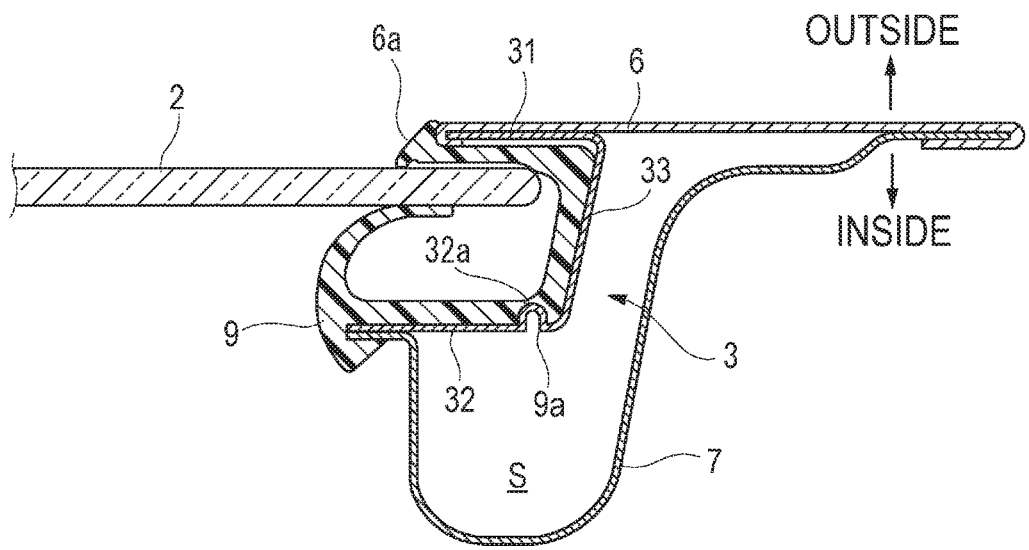
FIG. 3 is a sectional view taken along line A-A of the door panel illustrated in FIG. 1.

FIG. 3 is a sectional view taken along line A-A of the door panel 4 illustrated in FIG. 1. As illustrated in FIG. 3, the door panel 4 includes an outer panel 6 facing the outside of the vehicle in which the door 1 is installed, and an inner panel 7 facing the inside (interior side) of the vehicle. A glass run 9 and the door channel 3 are provided in the space S formed between the inner panel 7 and the outer panel 6. The resin glass run 9 is configured to guide the vertical movement of the door glass 2, and to seal the outer circumferential portion of the door glass 2.

The door channel 3 is configured to hold the glass run 9, and is formed of a metal material, for example. The cross section of the door channel 3 is formed in a substantially U shape. The door channel 3 has an outer wall (side wall part) 31 which faces the outer panel 6, an inner wall (side wall part) 32 which faces the inner panel 7, and an outer circumferential wall part 33 which is connected with the outer wall 31 and the inner wall 32. The frame 10 monolithically includes the inner wall 32, the outer wall 31, and the outer circumferential wall part 33.

The outer wall 31 and the inner wall 32 face each other with a predetermined space interposed therebetween. One end of the outer wall 31 and one end of the outer circumferential wall part 33 are connected with each other, and one end of the inner wall 32 and the other end of the outer circumferential wall part 33 are connected with each other. The outer wall 31 may be fixed in the outer panel 6, and the inner wall 32 may be fixed in the inner panel 7. In addition, the other end of the outer wall 31 is held by a bent part 6a of the outer panel 6.

Figure 4:
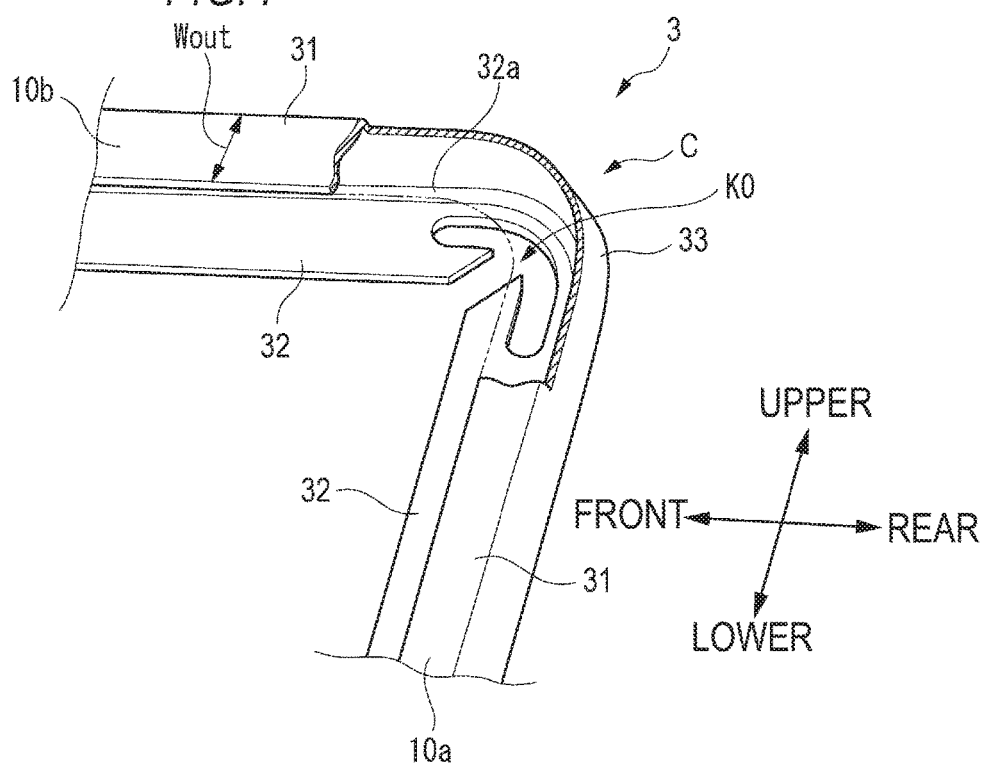
FIG. 4 is a perspective view illustrating the vicinity of a corner part of the door channel according to the embodiment.

FIG. 4 is a perspective view illustrating the vicinity of the corner portion C of the door channel 3 according to the embodiment. FIG. 4 illustrates the corner portion C which is provided in the rear end of the horizontal frame portion 10b.

As illustrated in FIG. 4, a notch K0 is formed in the corner portion C (bent portion) of the door channel 3 according to the embodiment. In FIG. 4, a portion of the outer wall 31 is virtually hidden in order to illustrate the notch K0.

In the corner portion C, the notch K0 is formed in the inner wall 32. The notch K0 is open in an inner corner part of the inner wall 32 in the corner portion C. Further, the notch K0 is formed such that the width Win of the remaining inner wall 32, which is not removed by the notch K0, is a uniform width F. In addition, the width Wout of the outer wall 31 is equal to or less than the width Win of the remaining inner wall 32, which is not removed by the notch K0. Incidentally, the width F indicates a dimension between the outer edge of the notch K0 and the outer edge of the outer circumferential wall part 33. In the width F, the dimension between an area (excluding both end portions having an R shape of the notch K0) reaching from a linear portion of the outer edge of the notch K0 through the bent part to another linear portion and the outer edge of the outer circumferential wall part 33 is preferably constant.

Figure 5:
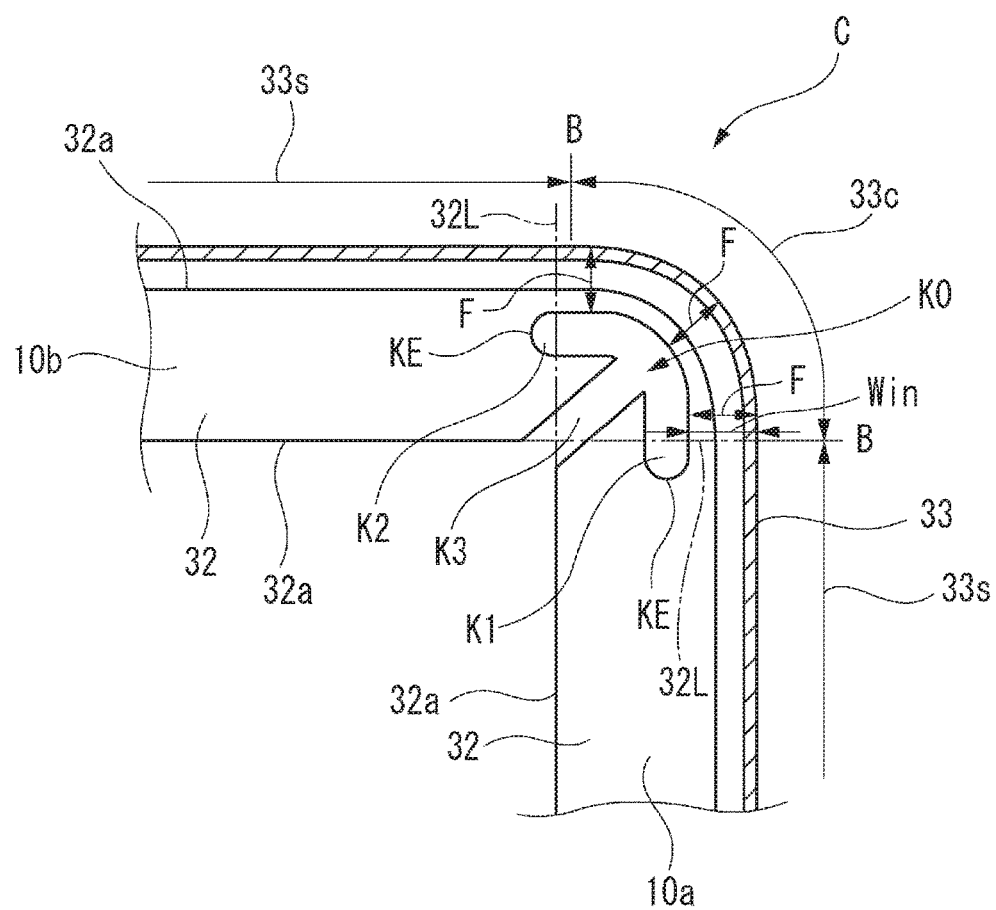
FIG. 5 is a sectional side view of an outer circumferential wall part of the door channel according to the embodiment in the vicinity of the corner part.

FIG. 5 is a sectional side view of the outer circumferential wall part 33 of the door channel 3 according to the embodiment in the vicinity of the corner portion C. As illustrated in FIG. 5, in side view of the door channel 3, a curved part 33C and a linear part 33S in the corner portion C as a bent portion are present in the outer edge of the outer circumferential wall part 33.

The notch K0 has a vertical portion K1 which extends along the vertical frame portion 10a, a horizontal portion K2 which extends along the horizontal frame portion 10b, and a inclined portion K3 which extends along the inner corner part of the corner portion C. In addition, both ends KE of the notch K0 extend to a position that exceeds a boundary B between the curved part 33C and the linear part 33S in the corner portion C. In addition, the both ends KE preferably extend to a position that exceeds an extended line 32L of the inner edge of the inner wall 32. Incidentally, the vertical portion K1 and the horizontal portion K2 preferably extend in a uniform width. The width of the vertical portion K1 and the width of the horizontal portion K2 are preferably the same.

The frame 10 of the door channel 3A is provided with a step part 32a in which the glass run 9 elastically supporting the door glass 2 is fitted. The step part 32a is formed in the inner wall 32 to have a uniform sectional shape from the vertical frame portion 10a through the corner portion C to the horizontal frame portion 10b. In this example, the step part 32a is a protrusion which protrudes to the side of the glass run 9, and is fitted in a recessed groove 9a formed in the glass run 9 (see FIG. 3). Further, the notch K0 is provided on the inner side of the step part 32a which is an inner circumferential side of the corner portion C.

Figure 6:
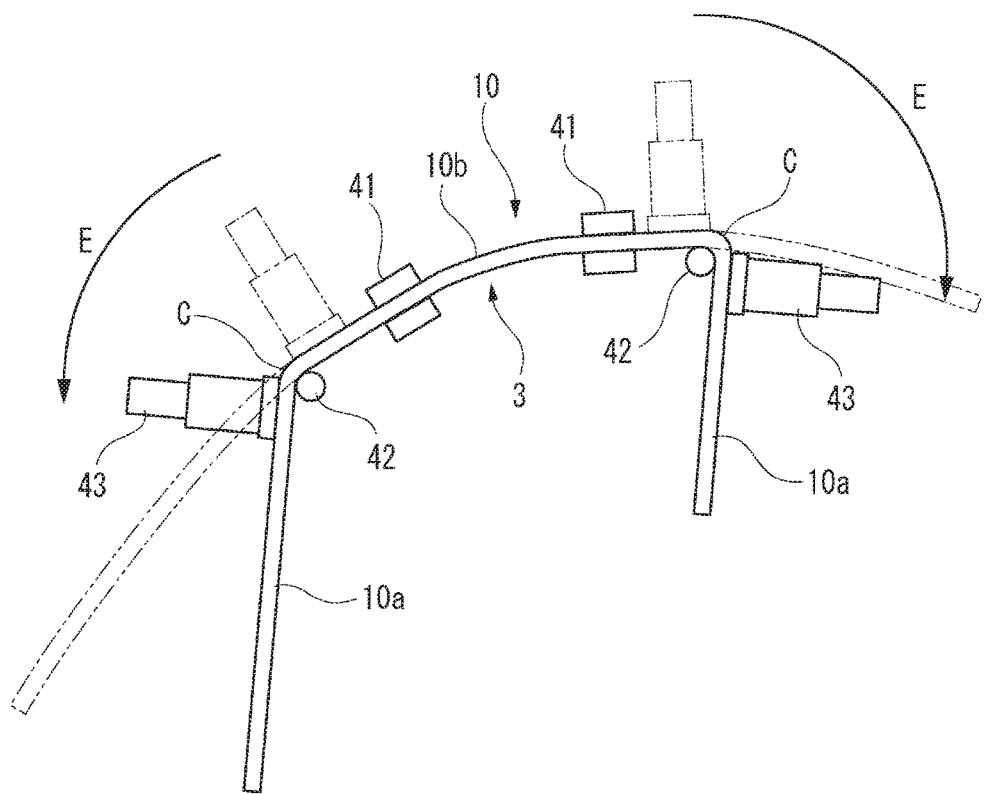
FIG. 6 is a plan view illustrating the whole of the door channel for explaining a process method of the door channel.

FIG. 6 is a plan view illustrating the whole of the door channel 3 for explaining how to work the door channel 3. At the time of processing the door channel 3 having the corner portion C in the front end and the rear end of the horizontal frame portion 10b, as illustrated in FIG. 6, the vicinity (to be the corner portion C) of each of the front end and the rear end of the horizontal frame portion 10*b* is clamped with a clamper 41, and a bending piece 42 is arranged inside a portion to be the corner portion C. In this state, at the forming place each of the corner portion C of the front end and the corner portion C of the rear end, the outer circumferential wall part 33 is pulled and extended in an inverse direction (an E direction indicated by an arrow in FIG. 6) by a bender 43 and is subject to the bending. In this manner, by the bender 43, the door channel 3 is obtained in which the corner portion C is formed in each of the front end and the rear end of the horizontal frame portion 10*b*. At that time, the notch K0 is formed in advance in a portion to be the corner portion C, and thus wrinkle is suppressed during the bending.

As described above, in the door channel 3 according to the embodiment, the both ends KE of the notch K0 provided in the inner wall 32 extend to a position that exceeds the boundary (also referred to as an R end) B between the curved part 33C and the linear part 33S. Thus, the wrinkle hardly occurs in the corner portion C during the bending.

Specifically, during the bending, a plastically deformed excess thickness portion moves toward the inner corner part of the corner portion C. At that time, the excess thickness portion can be released by the notch K0 which is open to the inner corner part of the corner portion C, so that the wrinkle hardly occurs.

In the vicinity of the R end which is the boundary B between the curved part 33C and the linear part 33S, the excess thickness portion is gathered in the both ends KE of the notch K0, and the excess thickness portion easily protrudes vertically from the inner wall 32. However, the both ends KE of the notch K0 extend to a position that exceeds the R end which is the boundary B between the curved part 33C and the linear part 33S, and thus the excess thickness portion hardly protrudes out.

The notch K0 is formed such that the width Win of the remaining inner wall 32, which is not removed by the notch K0, is a uniform width. During the bending, stress is equally applied to the outer portion of the corner portion C which is a portion of the remaining inner wall 32 by the notch K0. For this reason, wrinkle or distortion hardly occurs in the outer portion of the corner portion C.

The excess thickness portion which moves from the outer portion of the corner portion C is absorbed by the vertical portion K1 and the horizontal portion K2 of the notch K0. Thus, wrinkle or distortion hardly occurs in the outer portion of the corner portion C. In addition, the excess thickness portion which moves toward the inner corner part of the corner portion C is absorbed by the inclined portion K3 of the notch K0. Thus, wrinkle or distortion hardly occurs in the inner portion of the corner portion C.

The notch K0 is provided in a position that avoids the step part 32*a* fitted in the recessed groove 9*a* of the glass run 9. Thus, it is not necessary to change the shape of the glass run 9 to be fitted to the step part 32*a* from the existing glass run, so that the existing glass run can be diverted.

When the notch K0 is provided in the inner wall 32 facing the inner panel 7, the notch K0 may not be provided in the outer wall 31 facing the outer panel 6, and thus the sealing performance between the door channel 3 and the outer panel 6 can be maintained high.

In side view of the door channel 3, the width Wout of the outer wall 31 is equal to or less than the width Win of the remaining inner wall 32, which is not removed by the notch K0. Thus, when a base material is bent, the same level of stress can be applied to the outer wall 31 and the inner wall 32, and the door channel 3 can be obtained which is excellent in dimensional accuracy.

Figure 7:
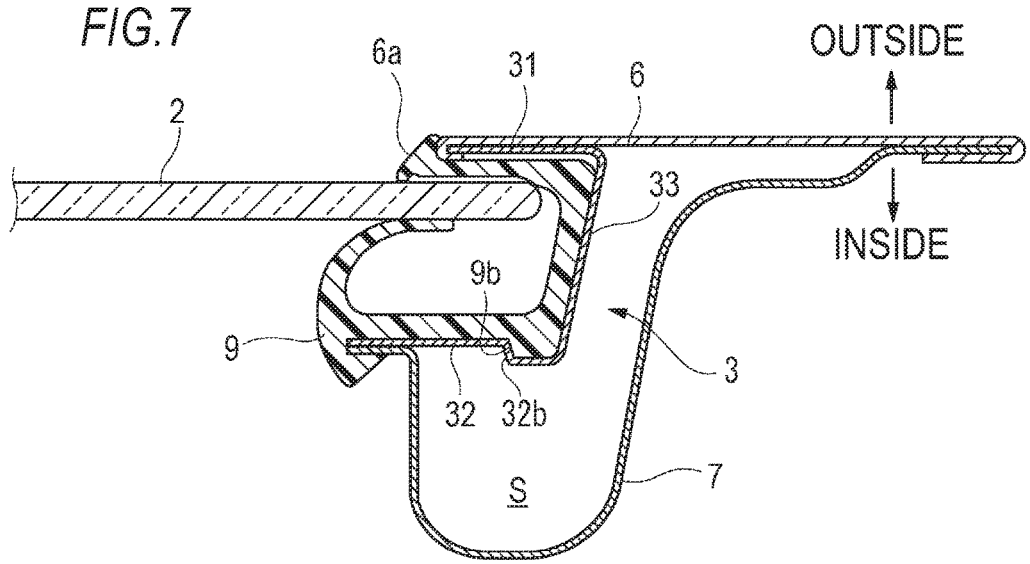
FIG. 7 is a view according to a modification of this disclosure and corresponding to FIG. 3.

In the above-described embodiment, as illustrated in FIG. 3, exemplarily, the step part 32*a* in which the recessed groove 9*a* of the glass run 9 is fitted is provided in the frame 10. However, this disclosure is not limited thereto. FIG. 7 is a sectional view of a door panel according to a modification of this disclosure, and is a view corresponding to FIG. 3. For example, as illustrated in FIG. 7, the step part 32*b* which supports a step difference part 9*b* of the glass run 9 may be provided in the frame 10.

Although the embodiment of this disclosure is described as above, the technical scope of this disclosure is not to be interpreted restrictively in the description of the embodiment. The above-described embodiment is merely given as an example, and a person skilled in the art would understand that various modifications can be made to the embodiment within the scope of this disclosure disclosed in the claims. Thus, the technical scope of this disclosure is to be defined based on the scope of this disclosure disclosed in the claims and an equivalent scope thereof.

What is claimed is:

1. A door channel, which is provided in a space formed between an inner panel and an outer panel of a vehicle door and guides a door glass therein to be freely lifted and lowered, the door channel comprising:
    a frame, which monolithically has a side wall part that faces at least one of the inner panel or the outer panel and an outer circumferential wall part that extends in a direction to intersect with at least one of the inner panel or the outer panel,
    wherein the frame monolithically has:
        a vertical frame portion, which extends in a vertical direction of a vehicle;
        a horizontal frame portion, which extends in a front-and-rear direction of the vehicle; and
        a curved bent portion, which connects the horizontal frame portion and the vertical frame portion and is formed by bending,
    wherein a curved part and a linear part in the bent portion are present in an outer edge of the outer circumferential wall part,
    wherein a notch which is open to an inner corner part of the bent portion is provided in the side wall part, and
    wherein both ends of the notch extend to a position that exceeds a boundary between the curved part and the linear part in the bent portion.

2. The door channel according to claim 1,
    wherein the notch is formed such that a width of a remaining side wall part, which is a part of the side wall part and is not removed by the notch, is a uniform width.

3. The door channel according to claim 1,
    wherein the notch has:
        a vertical portion, which extends along the vertical frame portion;
        a horizontal portion, which extends along the horizontal frame portion; and
        a inclined portion, which extends toward the inner corner part of the bent portion.

4. The door channel according to claim 1,
    wherein the frame has a step part in which a glass run elastically supporting the door glass is fitted,
    wherein the step part is formed in the side wall part to have a uniform sectional shape from the vertical frame portion through the bent portion to the horizontal frame portion, and wherein the notch is provided inside from the step part.

5. The door channel according to claim 1, wherein the side wall part has:
- an inner wall facing the inner panel; and
- an outer wall facing the outer panel, and wherein the notch is provided in the inner wall.

6. The door channel according to claim 5, wherein a width of the outer wall is equal to or less than a width of the remaining inner wall, which is not removed by the notch.

* * * * *